United States Patent [19]

Märkl

[11] 4,264,890

[45] Apr. 28, 1981

[54] BLINKING SIGNAL-LIGHT SYSTEM, ESPECIALLY FOR A SERIES OF EMERGENCY-PHONE STATIONS DISTRIBUTED ALONG THE LENGTH OF A HIGHWAY, OR THE LIKE

[75] Inventor: Georg Märkl, Nuremburg, Fed. Rep. of Germany

[73] Assignee: TE KA DE, Felten & Guilleaume Fernmoldeanlagen GmbH, Nuremburg, Fed. Rep. of Germany

[21] Appl. No.: 55,309

[22] Filed: Jul. 6, 1979

[30] Foreign Application Priority Data

Jul. 8, 1978 [DE] Fed. Rep. of Germany ....... 2830065

[51] Int. Cl.[3] .......................... G08G 1/07; H04B 3/50

[52] U.S. Cl. .................................... 340/22; 179/2.51; 179/5 R; 340/172; 340/310 A

[58] Field of Search ................... 340/22, 31 R, 26, 32, 340/35, 41 R, 147 L, 147 P, 167 R, 43, 168 R, 310 R, 310 A, 311, 172; 375/24, 25, 36; 179/5 R, 2.51; 307/31, 38, 40

[56] References Cited

U.S. PATENT DOCUMENTS

| | | | |
|---|---|---|---|
| 3,368,201 | 2/1968 | Skrobisch | 340/22 |
| 3,614,727 | 10/1971 | Fritts | 340/22 |
| 3,816,796 | 6/1974 | Molloy et al. | 340/35 |
| 3,832,679 | 8/1974 | Foley et al. | 340/22 |

FOREIGN PATENT DOCUMENTS 1933436 2/1977 Fed. Rep. of Germany .

*Primary Examiner*—James J. Groody

*Attorney, Agent, or Firm*—Michael J. Striker

[57] ABSTRACT

A succession of emergency-phone stations distributed along the length of a communications cable laid alongside a highway is powered from a remote central station. The phone stations are provided with lamps to form a blinking-lamp signalling system warning of upcoming traffic hazards. Each phone station's blinking system includes a code-evaluator circuit stage which interprets code signals transmitted along the power-supply circuit of the communications cable, the code signals identifying which stations are to have their lamps blink and in accordance with which blinking schedules. Each station is provided with a bistable activation stage which responds to the first occurrence of a transmitted-voltage boost by disconnecting from power the code-evaluator circuit stage of all flashing stations, and all circuitry of all non-flashing stations, but which reconnects to power upon the second occurrence of such voltage boost. The voltage boost is performed after the transmission of the code signals as blinking action actually commences, and is performed a second time when blinking action is terminated. The bistable activation stage at each station is permanently connected to power but draws virtually zero power except when a protracted interval of blinking action is initialed and terminated.

8 Claims, 7 Drawing Figures

BLINKING SIGNAL-LIGHT SYSTEM, ESPECIALLY FOR A SERIES OF EMERGENCY-PHONE STATIONS DISTRIBUTED ALONG THE LENGTH OF A HIGHWAY, OR THE LIKE

BACKGROUND OF THE INVENTION

The present invention concerns signal-light systems, most especially those provided along roads and highways. It is known to provide emergency-phone stations at intervals along the length of a highway, the emergency-phone stations being distributed along the length of a communications cable laid along the length of such highway. Such emergency-phone stations may be provided with signal-light systems. For example, each emergency-phone station in a series of such stations may be provided with a lamp which, from a remote central station, is caused to blink, to warn drivers that they are approaching the site of an accident, or the like. An operator at the remote central station selects which emergency-phone stations are to have their respective lamps blink, and the power needed to effect blinking of the lamps is transmitted to the activated emergency-phone stations via a power-supply line which runs along the communications cable and which supplies operating power to electrical equipment at such emergency-phone stations.

The German periodical "ADAC-Motorwelt," Nov. 1976, pp. 30–32, disclosed the use of the emergency-phone stations provided at intervals along the length of a highway for the generation of an optical warning action informing drivers of upcoming hazards. The optical warning action in question was to be implemented by blinking the exterior lamp with which each such emergency-phone station was anyway provided.

In order to increase the perceivability of the blinking action, Federal Republic of Germany published allowed patent application DE-AS No. 19 33 436 disclosed the use not of the exterior lamp anyway provided at such stations, but instead the provision of each such station with an electronic flash lamp capable of being flashed at higher brightness levels. Because the flash power needed by such flash lamps is greatly in excess of the power transmittable along the power line of the phone stations' communication cable, it is necessary to provide each station with a storage condensor, serving to periodically accumulate an amount of stored energy adequate to implement a flash.

Even when such storage capacitors are used, so as to be able to furnish to the flash lamps an instantaneous flash power vastly in excess of the power level instantaneously transmittable along the available cable, the fact remains that the low level of transmittable power places severe limits upon the amounts of flash energy which can be accumulated during the interflash intervals, especially when one considers that the interflash intervals must be kept quite short, in order that the flashing action attract the attention of drivers moving past the flashing stations at highway speed. For example, in the system disclosed in the aforementioned DE-AS No. 19 33 436, each emergency-phone station is provided not only with storage-capacitor circuitry, but additionally with signal-evaluating circuitry needed for the reception and evaluation of signals transmitted along the available cable for identification of which stations are to have their lamps flash. Such signal-evaluating circuitry consumes electrical power which might otherwise be used for flash energy, in a context where available energy is at a minimum.

SUMMARY OF THE INVENTION

Accordingly, it is a general object of the invention to provide a flashing-lamp signalling system of the type or having the characteristics of the type in question, in which to the extent possible the energy transmitted after the commencement of actual blinking action be utilized exclusively as actual flash energy.

In accordance with the present invention, this is accomplished by providing each flash-lamp station with signal-processing circuitry and other circuitry which can be disconnected from operating power after the commencement of actual flashing or blinking operation.

Thus, for example, in the presently preferred embodiment of the invention, the stations are each provided with flash lamps and with a code-evaluator stage which receives a transmitted code signal identifying selected stations and selected blinking schedules for the flash lamps. After each selected station has registered the flash-schedule command pertaining to it, the code-evaluator stages of all stations, both the non-selected stations and the selected stations, are disconnected from power. Each station is provided with an activation stage which is permanently connected to power but draws substantially zero power except when actual flashing action is to be initiated and then, after a prolonged period of flashing action, terminated. In the case of the stations not selected for flashing action, all circuitry involved in flashing action is disconnected from power after the commencement of flashing action at the other, selected stations, with the exception of the activation state at each such non-selected station. As a result, power not destined for conversion into actual flash energy is consumed to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
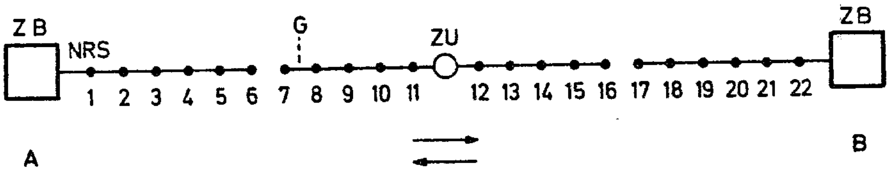
FIG. 1 schematically represents the stretch of cable between two manned highway police posts and a succession of emergency-phone stations connected at intervals to such cable.

FIG. 1 depicts a succession of emergency-phone stations, denoted NRS1–NRS22 spaced at intervals of about 2 kilometers each, between a manned highway police post ZB at a location A and another such post at location B. The manned posts ZB are referred to as central stations, for reasons which will become apparent. The emergency-phone stations NRS1–NRS22 are connected at intervals to a communications line which extends between the two manned posts ZB. The electrical power needed to operate the circuitry provided at the emergency-phone stations is transmitted to stations NRS1–6 from the central station ZB at location A, to stations NRS17–22 from the central station ZB at location B, and to stations NRS7–16 from an unmanned central station ZU. The power-supply lines from the manned stations ZB and from the unmanned station ZU are separate electrical circuits, as indicated by the gaps between stations NRS6 and NRS7, and between stations NRS16 and NRS17; in contrast, the communications channel to which the stations NRS1–22 are at intervals connected extends all the way between the central stations ZB at locations A and B, although this is not explicitly shown in the drawing, the power-supply lines being of interest. In certain conventional setups of this type, each power-supply line comprises two pairs of conductors. One pair of conductors is used to supply A.C. voltage to an exterior light at the emergency-phone station; the other pair of conductors has been conventionally used to supply A.C. voltage to a small lamp located in the emergency-phone mouthpiece to illuminate an indicium identifying the emergency-phone station by kilometer number, i.e., so that the user of the phone can inform highway police of his location. In FIG. 1, for the sake of simplicity, these two pairs of conductors are represented by a single power-supply line.

Likewise, whereas in FIG. 1 only a single succession of emergency-phone stations NRS1–22 is depicted, e.g., extending along one of the two sides of a highway, typically another such succession of phone stations is provided along the opposite-traffic-direction side of the highway. Accordingly, in FIG. 1, e.g. NRS4 denotes two emergency-phone stations, one located at the side of the highway of traffic travelling in the direction from A to B, the other at the side of the highway for traffic going in the direction from B to A; this is indicated by the two, oppositely pointed arrows in FIG. 1. The emergency-phone stations at both sides of the highway are connected to a common cable, a socalled omnibus line. This cable is laid along only one side of the highway, and the emergency-phone stations at the opposite side of the highway are connected to this cable by means of cross lines.

The transmission of voltage and current for the flashing-lamp highway signalling system is effected by means of a phantom circuit. Such phantom circuit may, for example, be formed from the two pairs of conductors used to energize the aforementioned exterior lights and the aforementioned lights for the kilometer indicia. The principle of phantom circuits utilizing center-tapped inductors or so-called phantom transformers is too well known in the electrical arts to require detailed explanation here.

The phantom circuit is used not only to transmit flash energy to the set of flash lamps with which each emergency-phone station is provided, but is additionally used to transmit code signals from the central stations to the various phone stations. The transmitted code signals serve, first, to identify which phone stations are to have their flashing-lamp systems activated, and serve, second, to identify what blinking schedule is to be followed at each activated station. Either the code signals are directly transmitted from a manned central station ZB to the emergency-phone stations, or else they are transmitted indirectly, first to the unmanned central station ZU and then to the emergency-phone stations. In the latter case, the code signals are converted, at the manned central station, into a form suitable for data transmission, then transmitted via the throughgoing communications cable to the unmanned central station, there converted back into their original form, and then transmitted to the emergency-phone stations. The code signals may be constituted by a series of pulsed A.C. voltage representing data by resort to a plurality of different voltage amplitudes. The code signals may additionally be used to actually supply the operating power to the evaluating circuitry with which each phone station is provided for the recognition of the code signals.

Figure 2:
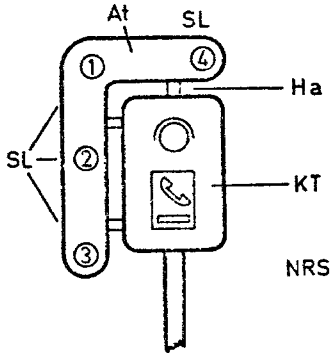
FIG. 2 depicts the appearance of an exemplary emergency-phone station, such as provided at intervals along the stretch of cable of FIG. 1.
Figure 3:
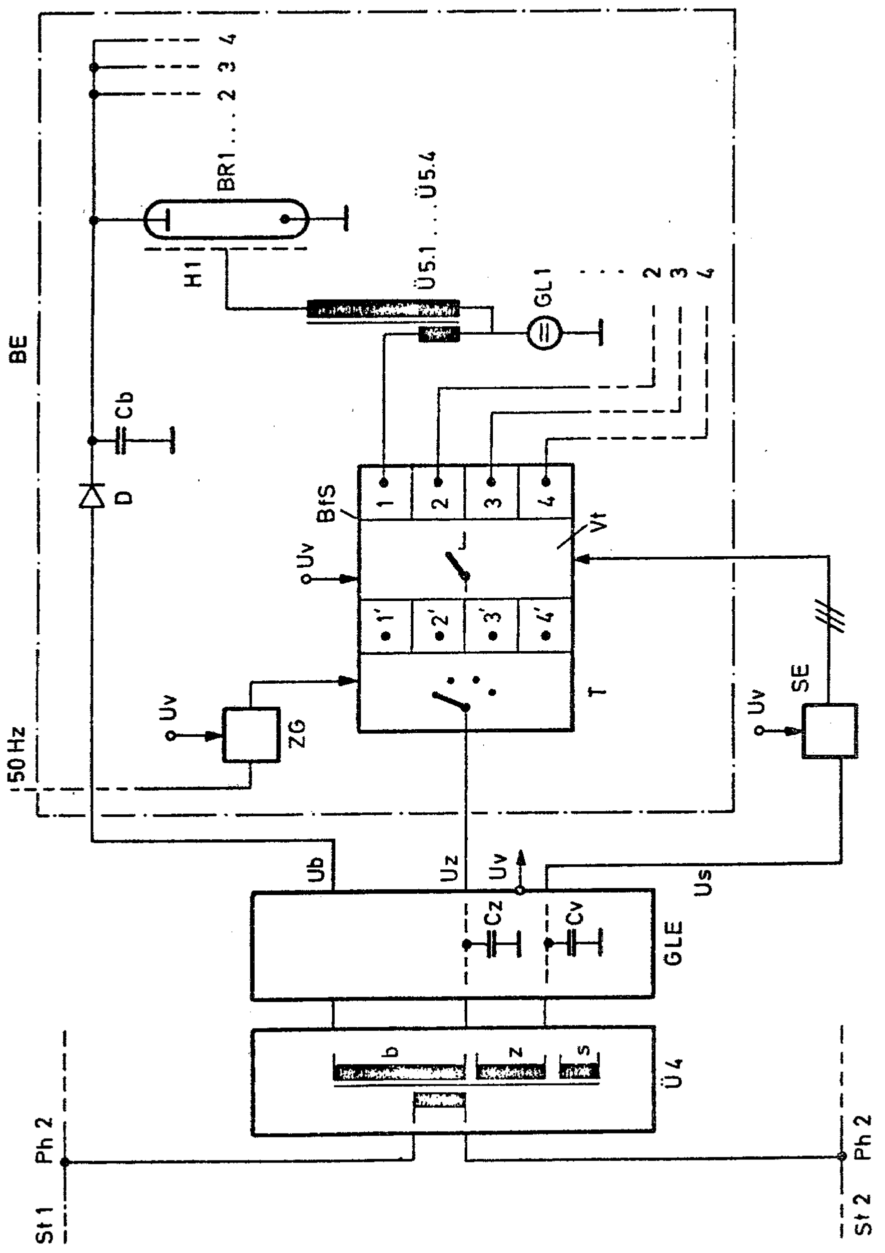
FIG. 3 is a schematic block diagram of the flash-control circuitry provided at each individual one of the emergency-phone stations.

Each emergency-phone station is provided with a flashing-lamp signalling subsystem comprised of four electronic flash lamps BR1–BR4 (cf. FIG. 3). These form parts of the four signal lamps SL1–SL4 (cf FIG. 2) provided at each phone station. Each set of four signal lamps SL1–SL4 is, as shown in FIG. 2, provided on an L-shaped bracket structure. At mounted by a mounting arrangement Ha on the head part KT of the respective phone station NRS. Structurally, the L-shaped disposition of the four signal lamps SL1–SL4 serves to shorten the effective lever arm which the mounting structure for the lamps presents to wind; also, the L-shaped organization can implement certain display effects explained in my simultaneously filed, commonly owned U.S. patent application Ser. No. 55,005, filed July 5, 1979, entitled "SIGNAL-LIGHT SYSTEMS, ESPECIALLY FOR A SERIES OF EMERGENCY-PHONE STATIONS DISTRIBUTED ALONG THE LENGTH OF A HIGHWAY, OR THE LIKE." The entire disclosure of which is incorporated herein by reference.

When a series of immediately successive phone stations is selected for activation, e.g., to warn of an upcoming traffic hazard or the like, in the preferred form of the invention the first station of the selected series of consecutive stations flashes only one of its four signal lamps SL1–SL4, the next, two of its signal lamps, and so forth, to create a subjective effect of increasing urgency or increasing closeness to the hazard being warned of.

Depending upon the nature of the hazard involved it may be appropriate to activate a series of stations at one side of the highway only, e.g., in the case of a traffic accident or a traffic jam, or it may be appropriate to activate a series of stations at both sides of the highway, e.g., in the case of a localized stretch of fog, a localized region of road-icing, etc. If for example in FIG. 1 the hazard location G is constituted by a localized region of road-icing, then those stations NRS5–7 which are at the side of the highway for travel in the A-B direction are activated, and also those stations NRS10-8 which are at the side of the highway for travel in the B-A direction. As will be explained further below, each emergency-phone station, or more precisely the flashing-lamp subsystem thereof, is individually selectable by means of an address signal, so that it be possible to activate the flashing-lamp subsystems at selected stations at one and/or the other side of the highway, despite the fact that all the phone stations at both sides of the highway are connected to a common cable.

FIG. 3 depicts the flash-lamp subsystem and the control circuitry therefor provided at one such emergency-phone station NRS: the configuration of the flash-lamp subsystem and control circuitry therefor is the same at each of the stations NRS. The aforementioned first pair of conductors St1 and the aforementioned second pair of conductors St2 constitute side circuits which together serve to form a phantom circuit. These two side circuits are used to transmit code signals to the emergency-phone stations, i.e., to select the particular stations whose flashing-lamp subsystems are to be activated for a particular instance of use, and to select the flash schedule to be followed at each of the activated stations. Additionally, as described below, the energy needed to power some of the circuitry at each station may be derived from the code signals themselves. The code signals are abstracted from the side circuits St1, St2 using phantom-circuit couplers Ph2 and are applied to the primary winding of a transformer U4 provided with three secondary windings s, z and b. The voltage produced across secondary winding s is applied to a rectifier and charging stage GLE (depicted in detail in FIG. 4), rectified and transmitted in the form of a code-signal voltage Us to a code-evaluator stage SE. The code-signal voltage developed is, as already indicated, of fairly high energy, and is utilized to charge a current-source condensor Cv. Current-source condensor Cv serves as a current source for the various circuit stages which control the flashing action at the station involved, furnishing an operating voltage Uv to stages SE, ZG and BfS. The actions just referred to will be explained in greater detail with regard to FIG. 4.

As explained in greater detail below, each code signal comprises an address signal which picks out a station to be activated and also a schedule signal which determines what flashing schedule is to be implemented at that station. The schedule signal is processed by code-evaluator stage SE, and the latter produces at its output data implementing the flashing schedule to be followed. Code-evaluator stage SE includes a conventional serial-to-parallel converter, which converts the serially arriving bits of the schedule signal into parallel form at the output of stage SE; this is indicated in FIG. 3 by the plural-wire output symbol on the output line which leads from stage SE to the distributor stage Vt of a flash-schedule circuit stage Bfs. The parallel data at the output of code-evaluator stage SE controls the operation of the distributor stage Vt of flash-schedule circuit stage Bfs by establishing differing combinations of connections as between terminals 1, 2, 3, 4 and 1', 2', 3', 4' of stage Bfs. After these terminal connections are once established, they remain established until disestablished. After the code signals have been received and the requisite terminal connections have been established, the actual blinking action commences. During blinking action, current-source condensor Cv is continually replenished with charge, so that the circuit stages SE, BfS and ZG be continually supplied with operating voltage.

The actual flash energy needed for the flash or blinking action is likewise transmitted along the phantom circuit via the side circuits St1 and St2. The voltage supplied by the latter is stepped up across secondary winding b of transformer U4, rectified in the rectifier and charger stage GLE, and applied in the form of an appropriate flash voltage Ub to the four flash lamps BR1-BR4 of the flash-lamp subsystem BE of the emergency-phone station. The flash voltage Ub is smoothened by a condensor Cb. A charging diode D prevents backflow of charge from the charged condensor Cb.

The flash-schedule circuit stage Bfs comprises a stepping switch T, which is controlled by a counting stage ZG. The counting state ZG counts 50-Hz half-cycles of, for example, the voltage supplied to the phone stations's exterior light or of the voltage supplied to the kilometer-indicator light of the stations's mouthpiece. Each time counting stage ZG has counted a predetermined number of supply-voltage half-cycles, it advances stepping switch T by one step, to make contact with terminals 1', 2', 3', 4' in cyclical sequence. The voltage developed across the secondary winding z of transformer U4 is used to charge a firing condensor Cz, and the voltage Uz developed across the latter constitutes the firing voltage used to fire the flash lamps BR1-BR4. Firing voltage Uz is applied to the input terminal of stepping switch T, for successive application to terminals 1', 2', 3', 4'.

Depending upon which of terminals 1, 2, 3, 4 have had connections established by distributor Vt to which terminals 1', 2', 3', 4', the firing voltage Uz is applied in the requisite sequence to successive ignition transformers U5.1, U5.2, U5.3, U5.4. Associated with each of these ignition transformers is a respective one of four glow lamps GL1-4 and a respective one of the firing electrodes H1, H2, H3, H4 of the four electronic flash lamps BR1, BR2, BR3, BR4. For the sake of simple illustration, only one glow lamp GL1 is depicted in FIG. 3, the others being indicated by their reference numerals, and likewise only flash lamp BR1 is depicted, the others being indicated by their reference numerals. When the firing voltage Uz is applied to ignition transformers U5.1, glow lamp GL1 is fired and, in conventional manner, through the intermediary of the high-voltage secondary winding of ignition transformer U5.1 and the firing electrode H1, and in cooperation with the flash voltage Ub applied across the two main electrodes of flash lamp BR1, effects firing of the latter. The firing of the other flash lamps is performed in the same way.

The firing method employed in FIG. 3 is externally triggered firing. This is in contrast to the usual method employed in such highway flash-lamp signalling systems (cf., e.g., DE-AS No. 19 33 436 mentioned above), according to which the moment of ignition is determined exclusively by the instantaneous state of charge of each flash lamp's storage condensor. The charging time allotted for the flash condensor Cb and the firing condensor Cz is such that, by the time stepping switch T has advanced to its next step, the flash voltage Ub and the firing voltage Uz will have again built up to their rated or designed values.

Figure 4:
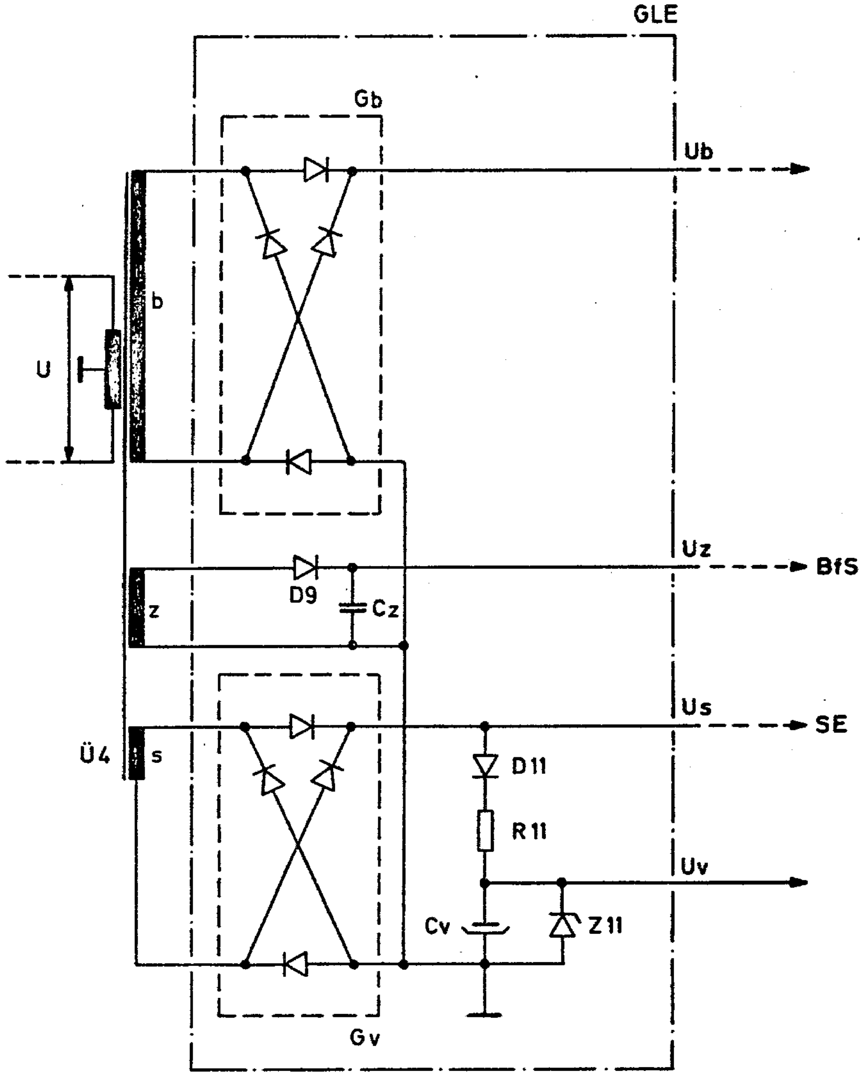
FIG. 4 depicts the internal configuration of the rectifier and charger stage GLE of FIG. 3.

FIG. 4 depicts the internal configuration of the rectifier and charger stage GLE of FIG. 3, operative for furnishing the flash voltage Ub, the firing voltage Uz, the code-signal voltage Us, and operating voltage Uv. The A.C. voltage U abstracted from the phantom circuit is directly stepped up to a level appropriate for flash energization by the secondary winding b of transformer U4, is rectified by a full-wave rectifier Gb, and is transmitted as a rectified but still unfiltered flash voltage Ub. The usual voltage stabilization, employed in the prior art mainly to hold constant the flash-repetition frequency which is to result, is here unnecessary because the firing of flash lamps is, as already indicated, externally triggered and not dependent upon the instantaneous state of charge of the capacitor Cb (see FIG. 3) responsible for storing flash-lamp flash energy.

The firing voltage Uz is derived from the voltage produced by secondary winding z, the latter voltage applied to ignition capacitor Cz via a charging diode D9.

The operating voltage Uv is derived from the voltage produced by secondary winding s, the latter voltage being applied to a full-wave rectifier Gv, and the rectified voltage used to charge current-source capacitor Cv through the intermediary of a charging diode D11 and a charging resistor R11. The operating voltage Uv can, of course, be a relatively low voltage, with secondary winding s dimensioned accordingly.

The code-signal voltage Us is likewise derived from the voltage produced by secondary winding s and rectified by rectifier Gv, and is transmitted to code-evaluator stage SE as already stated. In the exemplary embodiment here disclosed, the code-signal voltage Us is binary, and its constituent "0" and "1" bits are represented by a relatively lower and by a relatively higher voltage level, respectively. Because current-source capacitor Cv will have its charge continually replenished, i.e., during transmission of the two-voltage-level code-signal voltage too, the voltage across current-source capacitor Cv is stabilized by means of a zener diode Z11. Charging diode D11 serves to prevent charge flow from condensor Cv to the evaluating circuitry in code-evaluator stage SE, where it might otherwise introduce misinformation. Resistor R11 serves for decoupling.

The circuit stages SE, Bfs and ZG operating off operating voltage Uv will in general be IC stages, their power consumption accordingly being low compared to that of the actual flash lamps.

Figure 5:
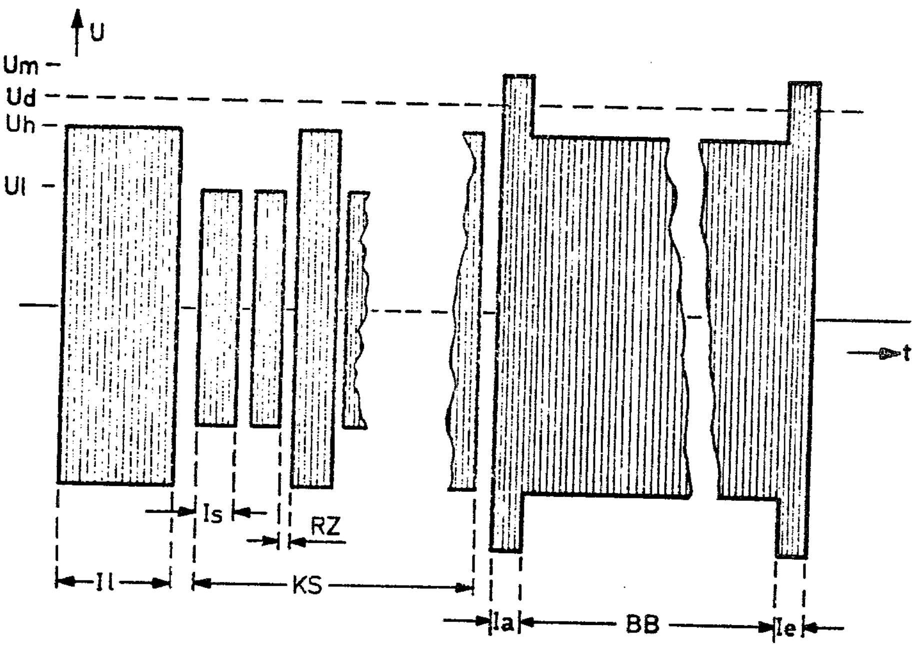
FIG. 5 depicts the form of the pulse-modulated A.C. voltage waveform utilized to activate selected series of stations and to determine the flashing schedules to be implemented at each station of such series.

FIG. 5 depicts as a function of time a representative interval of the pulse-modulated 50-Hz A.C. voltage transmitted by the phantom circuit for the activation of the flash-lamp subsystem of one phone station. The A.C. voltage cycles are represented by the hatching within the rectangular pulses. Keying of the voltage level of the transmitted A.C. voltage is performed at the central station from which the A.C. voltage is transmitted. Il denotes a capacitor-charging pulse. The duration of charging pulse Il is longer than the constituent signal pulses Is of the next-following code signal KS. Charging pulse Il serves to charge the current-source condensor Cv, so that operating voltage Uv be furnished to circuit stages SE, Bfs, and ZG, and perhaps other incidentally present circuit stages.

The code signal KS is constituted by A.C.-voltage pulses and is here binary coded. Although there exist a variety of techniques for representing the two logic levels of such a binary code, here the two logic levels are represented by voltage level alone. In particular, the lower voltage level Ul represents the binary state "0", and the high voltage level Uh represents the binary state "1". Each of these "0" and "1" pulses has a duration lasting for a succession of A.C. voltage cycles. The individual pulses are spaced in time by interpulse intervals RZ. During the interpulse intervals the transmitted A.C. voltage has zero amplitude. These A.C.-voltage pulses of the differing amplitudes Uh and Ul are, as described with respect to FIGS. 3 and 4, applied to transformer U4, and in those two FIGS. the transformed and rectified versions of them are denoted in common as the code-signal voltage Us.

The code signals are followed by an activation pulse Ia having a boosted amplitude Um and serving, in a manner described below, to activate the selected phone stations for commencement of blinking action. The activation pulse Ia is followed by transmission of A.C. voltage of amplitude Uh, which supplies power to the activated stations during the course of blinking action. The duration BB of the this transmitted interval of simple amplitude-Uh A.C. voltage may, of course, be on the order of hours, etc., depending upon how long a particular traffic hazard, or the like, continues in existence. Finally, another pulse Ie of boosted amplitude Um terminates the blinking action at all activated stations.

Figure 6:
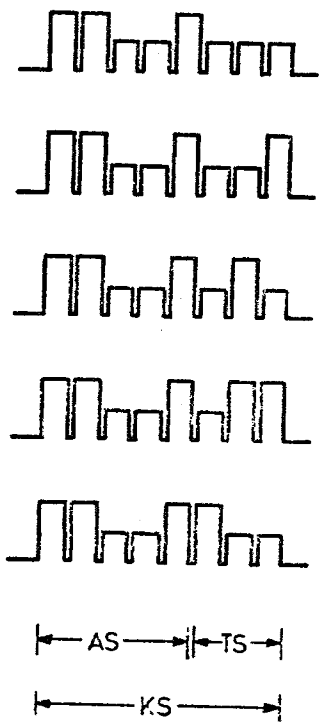
FIG. 6 depicts an example of a coding scheme used to identify which stations are to be activated, and used to identify which blinking schedules are to be followed.

FIG. 6 is a simplified, unipolar representation of five differing code signals KS configured in accordance with a merely exemplary code scheme. The five different code signals shown are all intended for a single one of the succession of emergency-phone stations involved. These five different code signals can be used to select, for the one station associated with these five different code signals, any one of a plurality of predetermined blinking schedules. Each code signal KS consists of an address signal AS and a schedule signal TS. The address signal AS is different for each different one of the phone stations. In FIG. 6, the address signal AS consists of five bits. The schedule signal TS determines the number of flash lamps which are to blink and also the sequence in which they are to blink. In the concrete example here given, the schedule signal consists of three bits.

The concrete example here given, in which each code signal KS consists of eight bits, is arbitrarily selected for explanatory purposes. Clearly, the number of bits which will actually be required for the address signal AS will depend upon the total number of emergency-phone stations to be addressed, and the total number of bits required for the schedule signal TS will depend upon the number of different blinking schedules to be made available. In the example depicted in FIG. 6 $2^5=32$ emergency-phone stations can be individually addressed, and $2^3=8$ different blinking schedules can be commanded.

After the requisite number of code signals KS have been transmitted, i.e., their number depending upon the number of phone stations selected for activation, activation pulse Ia initiates blinking action. During blinking action, the activated, i.e., blinking, stations NRS have their code-evaluator stages SE disconnected from operating voltage Uv, so as not to draw power unnecessarily, whereas their blinking schedule circuit stages BFS and their counting stages ZG remain connected to operating voltage Uv. During blinking action, the unactivated or non-selected stations NRS, i.e., the entirely non-blinking stations, have all their circuit stages disconnected from the power-line voltage, with the exception of one activation stage at each station which remains connected to power-line voltage. This will now be explained with reference to FIG. 7.

Figure 7:
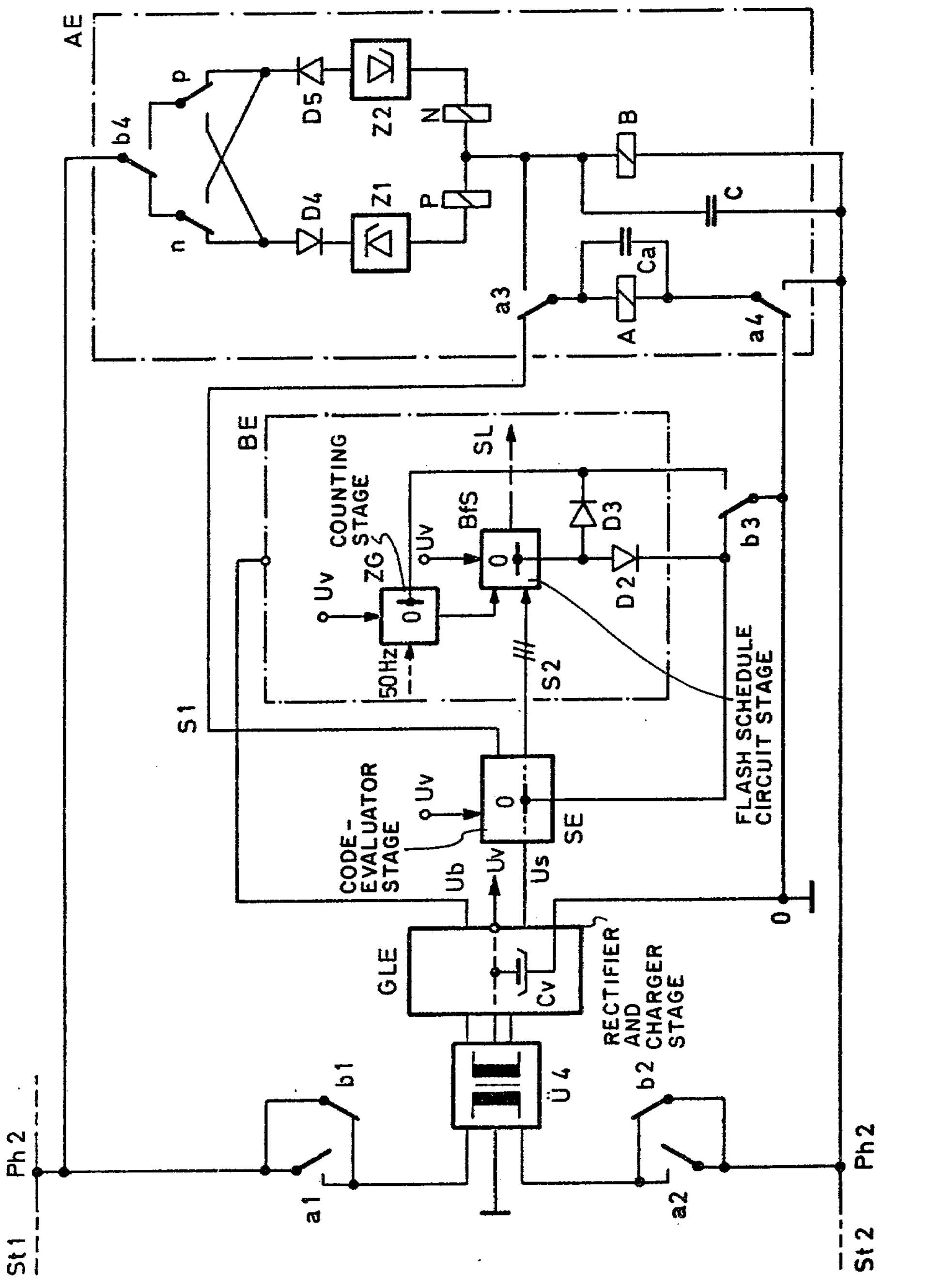
FIG. 7, like FIG. 3, depicts the circuitry with which each station is provided, the stages depicted in FIG. 3 being depicted in a more simplified manner in FIG. 7, FIG. 7 depicting additional circuit components not shown in FIG. 3.

FIG. 7 depicts the same circuitry as shown in FIG. 3, but somewhat more schematically with regard to the stages already shown in FIG. 3. As shown in FIG. 7, the circuitry at each emergency-phone station comprises, in addition to what is shown in FIG. 3, an activation stage AE, and certain other components about to be described.

Except for activation stage AE, all circuitry, i.e., all circuitry relating to flashing-light signalling, is connected to the side circuits St1, St2 of the phantom circuit via relay contacts a1, b1 and a2, b2. Relay contacts a1, a2 are NO (normally open) contacts controlled by a relay winding A in activation stage AE; relay contacts b1, b2 are NC (normally closed) contacts controlled by a relay winding B. As shown in FIG. 7, the primary winding of transformer U4 is center-tapped with its center tap connected to ground.

The activation stage AE comprises a threshold-voltage switching stage comprised of two zener diodes Z1, Z2, operative for responding to the boosted voltage amplitude Um referred to earlier, and therefore responsive to the activation pulse Ia and the termination pulse Ie. The breakdown voltage Ud of the zener diodes Z1, Z2 is greater than the voltage amplitude Uh of the charging pulse Il and of the A.C. supply voltage, likewise of amplitude Uh, transmitted during the interval BB for the powering of blinking action. So long as the zener diodes Z1, Z2 remain in non-conductive state, negligible current flows through them. Instead of zener diodes, use could be made of thyristors, schmitt triggers, or the like.

After the charging pulse Il, which assures that adequate operating voltage Uv will be available, the code-signal voltage Us is applied to the code-evaluator stages SE of all phone stations in common. If, for example, three stations are to be activated for flashing action, the code-signal voltage Us will comprise three successive code signals KS, each one pertaining to one of the three selected stations. When the station whose circuit is assumed illustrated in FIG. 7 receives the code signal KS pertaining to it, it responds to the address-signal component AS thereof by transmitting the operating voltage Uv via a control line S1 (this control line not shown in FIG. 3) and via a relay contact a3 to relay winding A. Winding A is now energized, its current path being completed by a further relay contact a4. With winding A now energized, its associated relay contacts a1, a2, a3, a4, switch over from their illustrated to their non-illustrated settings. As relay contacts a3, a4 change setting, and therefore briefly interrupt the current path of winding A, a capacitor Ca maintains winding A energized until the relay A, a1–a4 has completed its change of state. NO contacts a1, a2 now close, shunting NC contacts b1, b2. It is emphasized that this happens only at the phone stations which have been selected for flashing. Later, NC contacts b1, b2 will open at all stations, both those selected for flashing action and those not selected. Accordingly, if the station involved is one which has been selected for flashing, the closure of contacts a1, a2 assures that the transformer U4 at that station will remain connected to the phantom circuit.

With relay contacts a3, a4 now in their non-illustrated settings, the lower terminal of winding A is disconnected from the grounded terminal of current-source capacitor Cv, and the upper terminal of winding A is disconnected from the operating voltage Uv which the code-evaluator stage SE has applied to control line S1, i.e., which has been applied to line Sl if the station involved has been selected for flashing action. Accordingly, relay winding A is now disconnected from the current-source capacitor Cv of the rectifier and charger stage GLE.

The two relays A and B are magnetic, bistable latching relays. Accordingly, the contacts a1, a2, a3, a4 of relay A remain in their non-illustrated setting, despite the disconnection of winding A from operating voltage capacitor Cv. Specifically, contacts a1–a4 remain in their non-illustrated settings, until there is applied to relay winding A a pulse having a polarity opposite to that of the voltage which caused this relay to convert to its non-illustrated state. If relay A, when in non-illustrated state, receives further pulses of the same polarity as the voltage which effected the transition to non-illustrated state, the relay merely remains in its non-illustrated state.

As already explained with regard to FIG. 3, the control lines indicated by the plural-wire output symbol emanating from code-evaluator stage SE cause flash schedule circuit stage Bfs to establish the commanded flash or blinking schedule. The flash schedule circuit Bfs registers the flash-schedule command, and requires operating voltage Uv to continue this registration during flashing action. Accordingly, in the case of a station selected for flashing, flash schedule circuit Bfs must remain connected to operating voltage Uv.

Flash schedule circuit Bfs is kept connected to operating voltage Uv as follows. The positive terminal of current-source capacitor Cv, denoted Uv, is connected to the positive operating-voltage supply terminal of stage Bfs permanently, as shown in FIG. 7. A ground terminal within stage Bfs, denoted 0, is connected to the grounded terminal of current-source capacitor Cv through two diodes D2, D3 and a relay contact b3 associated with relay winding B. Accordingly, no matter which of its two settings relay contact b3 assumes, the ground terminal 0 within stage Bfs remains connected to the grounded terminal of capacitor Cv, and accordingly the output voltage of capacitor Cv remains connected across the operating-voltage input of stage Bfs.

Operating voltage Uv is applied across the operating-voltage inputs of code-evaluator stage SE and of counting stage ZG in a similar manner. I.e., the positive terminal of current-source capacitor is permanently connected to the positive terminal of the operating-voltage input of each of stages SE and ZG, and the ground terminal 0 of each of these two stages SE and ZG is connected to the grounded terminal of capacitor Cv through the intermediary of relay contact b3. However, whereas operating voltage Uv remains applied aross stage Bfs no matter what the setting of contact b3, the situation is different for code-evaluator stage SE and counting stage ZG. In particular, the operating-voltage input of stage SE is connected across current-source capacitor Cv only when contact b3 is in its illustrated setting. Conversely, the operating-voltage input of stage ZG is connected across capacitor Cv only when contact b3 is in its non-illustrated setting.

After all the code signals KS of the code-signal voltage Us have been transmitted, the flash schedule circuits Bfs at all selected stations will have registered their respective flash-schedule commands, and the relay contacts a1–a4 at each selected station will be in non-illustrated setting. The relay contacts a1–a4 at each non-selected station will be in illustrated setting.

The code signals KS are, as shown in FIG. 5, followed by the activation pulse Ia, which is of elevated amplitude Um in excess of the breakdown voltage Ud of zener diodes Z1, Z2. Until now, relay winding B has not yet been energized, and its associated contacts b1–b4 are as yet still in their illustrated settings. Because contact b4 is in its illustrated setting at the time of arrival of the activation pulse Ia, pulse Ia is applied via a relay contact n to a diode D4, which latter transmits only the positive half-cycles of the Um-amplitude pulse Ia. The positive half cycles effect breakdown of zener diode Z1, and the latter transmits positive current through a relay winding P and through relay winding B, for the duration of activation pulse Ia. First in time, this positive current activates relay P and thereby causes associated relay contact p to switch over from its illustrated to its non-illustrated setting. Second in time, due to the provision of a capacitor C across winding B, this positive current activates the bistable magnetic latching relay B, causing contacts b1–b4 to change over to their non-illustrated settings. Because contacts a3, a4 are at this time in their non-illustrated settings, this positive current furthermore is applied to the winding of relay A, but without effect because relay A has already changed state in response to a positive current and can now only change state in response to a negative current.

Because, in response to activation pulse Ia, contact p changes to non-illustrated setting before contact b4 does, pulse Ia will continue to be applied to diode D4 after contact b4 has indeed changed to non-illustrated setting. Accordingly, the flow of positive current transmitted by zener diode Z1 will continue until the end of activation pulse Ia. During the brief interruption in the positive current transmitted by diode Z1, i.e., as contact b4 switches over to non-illustrated setting, winding B will be kept energized by the capacitor C connected across it. To keep winding P energized during this brief interruption, it is not necessary to similarly provide it with a shunt capacitor, if the drop-out action of relay P is sufficiently slow; similar remarks apply to relay N, not yet discussed. However, if a shunt capacitor were in fact provided across relay winding P (and analogously across relay winding N), the time-constant introduced by such shunt capacitor could readily be selected such that, as already stated, contact p change over to its non-illustrated setting before contact b4 does.

In any event, in response to the activation pulse Ia, relay B does undergo a change of state, and its associated contacts b1–b4 change to their non-illustrated settings. This happens both at stations which have been selected for flashing action and at stations which have not been selected. At the non-selected stations, contacts b1, b2 are now open, as are also contacts a1, a2, and thus the transformers U4 at the non-selected stations are disconnected from the phantom circuit. At the selected stations, contacts b1, b2 are likewise open, but contacts a1, a2 have earlier been closed, so that the transformers U4 at the selected stations remain connected to the phantom circuit.

Accordingly, at the non-selected stations, all circuitry shown in FIG. 7 is disconnected from the phantom circuit and thereby disconnected from power, except for the activation stages AE at the non-selected stations.

After the activation pulse Ia has been transmitted, the contacts b3 at all stations, both selected and non-selected, are in non-illustrated setting. Accordingly, at the selected stations, the code-evaluator stages SE are disconnected from operating voltage Uv, whereas the flash schedule stages Bfs and the counting stages ZG are connected to operating voltage Uv. Similar connections exist at the non-selected stations, but at the non-selected stations the transformers U4 are disconnected from the powering phantom circuit.

The contacts b3 at all selected stations (and indeed at the non-selected stations as well) all change over to non-illustrated setting simultaneously, applying operating voltage to all the counting stages ZG of the selected stations simultaneously. In order to assure that all counting stages ZG start at the same initial count, use can be made of counting stages of the type which automatically reset when operating voltage is first applied to their operating-voltage input. This serves to establish a predetermined phase interrelationship as among the flash schedules which will be followed at the individual ones of the selected stations.

During the interval BB of actual blinking operation (see FIG. 5), A.C. voltage of amplitude Uh is transmitted along the phantom circuit. This amplitude is lower than the breakdown voltage Ud of zener diodes Z1, Z2. The amount of current which these diodes draw during the long interval BB of blinking action is negligible.

When the blinking-action interval BB commenced, i.e., upon termination of the activation pulse Ia, relay P became unenergized. Accordingly, during the course of blinking action, contact p is, again, in its illustrated setting.

When blinking action is to be terminated, e.g., because the traffic hazard being signalled is no longer present, a termination pulse Ie (see FIG. 5) is transmitted. This termination pulse Ie, like activation pulse Ia, has an amplitude Um greater than the blinking-interval A.C. voltage amplitude Uh and greater than the breakdown voltage Ud of the zener diodes.

When termination pulse Ie is transmitted, it is applied via contact b4 (which is in its non-illustrated setting) and via contact p to diode D5, the latter transmitting only the negative half-cycles thereof. The amplitude of the negative half-cycles exceeds the breakdown voltage of zener diode Z2, and the latter transmits negative current through relay winding N, through relay winding B, and through relay winding A. Bistable relays A and B return to their original states, so that upon conclusion of the termination pulse Ie, all relay contacts at all stations will again be in the settings illustrated in FIG. 7, i.e., in preparation for a new selection of phone stations for flashing action. The relay winding N and its associated contact n serve a purpose analogous to that of winding P and contact p.

In the illustrated embodiment, initiation and termination of actual blinking action are effected in response to pulses of boosted amplitude Um, but the relay windings which are energized as a result are energized by current derived from a voltage which is approximately equal to the difference between Um and the zener-diode breakdown voltage Ud. Therefore, despite the high absolute values of the voltages involved, the voltage difference in question is, by comparison, small and suitable for direct application to the relays A, B, N and P, i.e., without the use of protective, voltage-reducing measures involving voltage dividers, series current-limiting resistors, or the like.

Because the successive phone stations are located at differing distances from the central station from which the receive power, the voltage drops at the power-supply line used will be different at different stations. In order to assure that sufficient voltage is provided at each station for energization of the relays A, B, N and P, Um may be selected high enough to assure reliable energization of these relays at the most distant of the succession of phone stations. The energizing current supplied to these relays at the station closest to the central station will then be higher than at the most distant station. In general, however, this will not be problematic, because the duration of the boost to amplitude level Um will anyway be very short; furthermore, the mount of the amplitude boost (Um—Uh) need only be such that the energizing current for the relays of the most distant station will just exceed the minimum energizing current needed for relay operation. Similar considerations apply to the fact that the relay-activating current which each individual station draws will depend upon whether it is a selected or a non-selected station; in the case of a selected station both relay A and relay B are energized, whereas in the case of a non-selected station only relay B. However, if actually considered necessary, current-limiting resistors could be provided in the activation stages SE of the closer stations, i.e., such as to reduce the relay-energizing currents which develop down to the level of those which develop at the most distant station.

It will be understood that each of the elements described above, or two or more together, may also find a useful application in other types of circuits and constructions, differing from the types described above.

While the invention has been illustrated and described as embodied in a highway signalling system which makes use of a succession of emergency-phone stations in particular, is is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A blinking-lamp signalling system for use distributed along the length of a highway, or the like, the blinking-lamp signalling system comprising

- a succession of signal-lamp stations each comprising at least one signal lamp,
- transmission circuit means extending along the succession of signal-lamp stations, the signal-lamp stations being connected at intervals to the transmission circuit means,
- a central station connected to the transmission circuit means and including means transmitting to the signal-lamp stations power and also code signals identifying which signal-lamp stations have been selected to have their signal lamps blink,
- code-signal evaluating means provided at each signal-lamp station for receiving and interpreting the code signals, and
- switching means provided at each signal-lamp station and operative after interpretation of the code signals by the code-signal evaluating means for automatically disconnecting the code-signal evaluating means from power.

2. The blinking-lamp signalling system defined in claim 1, the code-signal evaluating means at all signal-lamps stations being normally connected to power, the switching means comprising means responding to a signal transmitted by the transmission circuit means for disconnecting the code-signal evaluating means of all the selected signal-lamp stations from power at the start of a protracted interval of blinking action performed by the lamps of the selected stations and responding to a signal transmitted by the transmission circuit means for reconnecting the code-signal evaluating means of all the selected signal-lamp stations to power at the end of the interval of blinking action performed by the lamps of the selected stations.

3. The blinking-lamp signalling system defined in claim 1, the code-signal evaluating means at all signal-lamp stations being normally connected to power, the switching means comprising means responding to a signal transmitted by the the transmission circuit means for disconnecting the code-signal evaluating means of all signal-lamp stations, both the selected stations and the stations not selected, from power at the start of a protracted interval of blinking action performed by the lamps of the selected stations and responding to a signal transmitted by the transmission circuit means by reconnecting the code-signal evaluating means of all the signal-lamp stations to power at the end of the interval of blinking action performed by the lamps of the selected stations.

4. The blinking-lamp signalling system defined in claim 1, the switching means comprising means operative after interpretation of the code signals by the code-signal evaluating means for automatically disconnecting from power the code-signal evaluating means at each selected signal-lamp station and for automatically disconnecting from power the code-signal evaluating means without the switching means itself becoming disconnected from power.

5. The blinking-lamp signalling system defined in claim 1, the switching means being operative for disconnecting the code-signal evaluating means from power in response to a voltage transmitted by the transmission circuit means having a voltage level in excess of that of the code signals.

6. The blinking-lamp signalling system defined in claim 1, the switching means comprising means responding to a voltage of predetermined voltage level transmitted by the transmission circuit means by terminating blinking action performed at said signal-lamp stations which have been selected.

7. The blinking-lamp signalling system defined in claim 1, the switching means comprising means responding respectively to a voltage of predetermined voltage level transmitted by the transmission circuit means by generating a current of a first polarity effecting disconnection of the code-signal evaluating means from power and to another voltage of predetermined voltage level transmitted by the transmission circuit means by generating a current of opposite second polarity effecting reconnection of the code-signal evaluating means to power.

8. The blinking-lamp signalling system defined in claim 7, the switching means comprising bistable magnetic relay means responding to said first-polarity current by assuming a first state disconnecting the code-signal evaluating means from power and responding to said second-polarity current by assuming a second state reconnecting the code-signal evaluating means to power.

* * * * *